United States Patent
Adderly et al.

(10) Patent No.: US 10,534,536 B2
(45) Date of Patent: *Jan. 14, 2020

(54) REPLACEMENT OF PHYSICAL BUTTONS WITH VIRTUAL CONTROLS

(71) Applicant: International Business Machines Corporation, Armonk, NY (US)

(72) Inventors: Darryl M. Adderly, Morrisville, NC (US); Rosanna S. Mannan, San Jose, CA (US); Kevin L. Schultz, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/421,511

(22) Filed: May 24, 2019

(65) Prior Publication Data

US 2019/0278475 A1     Sep. 12, 2019

Related U.S. Application Data

(63) Continuation of application No. 15/402,558, filed on Jan. 10, 2017, now Pat. No. 10,338,812.

(51) Int. Cl.
*G06F 3/041* (2006.01)
*G06F 3/0488* (2013.01)
(Continued)

(52) U.S. Cl.
CPC ........ *G06F 3/04886* (2013.01); *G06F 1/1692* (2013.01); *G06F 3/017* (2013.01);
(Continued)

(58) Field of Classification Search
CPC ...... G06F 3/0416; G06F 3/044; G06F 3/0414; G06F 3/017; G06F 3/04886
See application file for complete search history.

(56) References Cited

U.S. PATENT DOCUMENTS 7,656,393 B2   2/2010   King
8,310,454 B2   11/2012  Yang
(Continued)

FOREIGN PATENT DOCUMENTS

WO   2012054005 A1   4/2012
WO   2013163233 A1   10/2013

OTHER PUBLICATIONS

"Apple Invents All-New Methods to Accommodate One-Hand iPhone Users", Patently Apple, Jun. 23, 2016, 9 Pages, <http://www.patentlyapple.com/patently-apple/2016/06/apple-invents-all-new-methods-to-accommodate-one-handiphone-users.html>.

(Continued)

*Primary Examiner* — Xuemei Zheng
(74) *Attorney, Agent, or Firm* — David B. Woycechowsky (57) ABSTRACT

In an approach for controlling a computing device without mechanical buttons the computer detects an interaction with a touch capacitive sensing surface on a computing device. The computer determines that the detected interaction includes at least three interactions including at least two different touch capacitive sensing surfaces. The computer determines a virtual control button to display based on the detected interaction. The computer displays the determined virtual control button to the user. The computer receives an interaction with the displayed virtual control button. The computer implements an action associated with the determined virtual control button based on the received interaction.

1 Claim, 7 Drawing Sheets

(51) Int. Cl.
*G06F 3/01* (2006.01)
*G06F 3/044* (2006.01)
*G06F 3/0484* (2013.01)
*G06F 1/16* (2006.01)

(52) U.S. Cl.
CPC ............ *G06F 3/044* (2013.01); *G06F 3/0416* (2013.01); *G06F 3/04847* (2013.01)

(56) References Cited

U.S. PATENT DOCUMENTS

| | | |
|---|---|---|
| 8,421,483 B2 | 4/2013 | Klinghult |
| 8,766,936 B2 | 7/2014 | Kawalkar |
| 8,954,887 B1 | 2/2015 | Tseng |
| 9,703,375 B2 | 7/2017 | Kuehne et al. |
| 10,067,671 B2 | 9/2018 | Adderly |
| 10,338,812 B2 | 7/2019 | Adderly |
| 2014/0320420 A1 | 10/2014 | Ida |
| 2015/0002449 A1 | 1/2015 | Lewis |
| 2015/0103018 A1* | 4/2015 | Kamin-Lyndgaard ............ G09G 5/006 345/173 |
| 2015/0261362 A1 | 9/2015 | King et al. |
| 2016/0026306 A1 | 1/2016 | Wu |
| 2016/0062515 A1 | 3/2016 | Bae |
| 2016/0098107 A1 | 4/2016 | Morrell |
| 2016/0132132 A1 | 5/2016 | Li |
| 2016/0147365 A1 | 5/2016 | Yoshida |
| 2016/0154489 A1 | 6/2016 | Collins et al. |
| 2016/0179338 A1 | 6/2016 | Miller |
| 2016/0291731 A1 | 10/2016 | Liu |
| 2017/0131811 A1 | 5/2017 | Watanabe |
| 2017/0285834 A1* | 10/2017 | Chin .................. G06F 3/0416 |
| 2017/0300205 A1 | 10/2017 | Villa |
| 2017/0357440 A1 | 12/2017 | Tse |
| 2018/0196594 A1 | 7/2018 | Adderly |

OTHER PUBLICATIONS

"Low Power Capacitive Sensing", Silicon Labs, AN507, Copyright © 2013 by Silicon Laboratories, Silicon Laboratories Inc. 400 West Cesar Chavez, Austin, TX 78701, USA, Rev 0.2 Jul. 2013, 7 Pages.

"Metal Over Cap", Microchip, Printed Oct. 24, 2016, 3 Pages, <http://www.microchip.com/design-centers/touchinput-sensing/proximity-keys-and-sliders/technology/metal-over-cap>.

Ballard, Barclay, "Introducing the Manta X7: The completely button-less smartphone", IT Pro Portal; Dec. 2, 2014, 6 Pages, <http://www.itproportal.com/2014/12/02/introducing-manta-x7-completely-button-less-smartphone/>.

Dobie, Alex, "Buttonless Samsung phone appears in leaked photo, claims to be the GT-i9300", Mar. 22, 2012, 8 Pages, <http://www.androidcentral.com/buttonless-samsung-phone-appears-leaked-photo-claims-be-gt-i9300?>.

Lin, Sara, "Samsung Galaxy S6 Edge: How to Use the Edges Like a Pro", Guiding Tech, Jul. 24, 2016, 22 Pages, <http://www.guidingtech.com/41574/samsung-galaxy-s6-edge-tips/>.

Mitroff, Sarah, "Get to know the People Edge on the Galaxy S6 Edge", Apr. 8, 2015, 6 Pages, <https://www.cnet.com/how-to/get-to-know-the-people-edge-on-galaxy-s6-edge/>.

Padla,R., "Rendered images of concept buttonless phone by LeEco", Mar. 16, 2016, 3 Pages, <http://androidcommunity.com/rendered-images-of-concept-buttonless-phone-by-leeco-20160316/>.

Paul, K., "Manta 7X details revealed—massive battery, absolutely no hardware buttons", Posted: Feb. 2, 2015, 5 Pages, <http://www.phonearena.com/news/Manta-7X-detalls-revealed--massive-battery-absolutely-no-hardwarebuttons_id65484>.

Quick, Darren, "Smarter touch surfaces with new pressure sensitive technology", Aug. 28, 2009, 5 Pages, <http://newatlas.com/pressure-sensitive-touchpad/12638/>.

Adderly et al., "Replacement of Physical Buttons With Virtual Controls", U.S. Appl. No. 16/421,518, filed May 24, 2019, 42 pages.

IBM Appendix P, list of patents and patent applications treated as related, filed herewith, 2 pages.

* cited by examiner

REPLACEMENT OF PHYSICAL BUTTONS WITH VIRTUAL CONTROLS

BACKGROUND

The present invention relates generally to the field of electronic devices, and more particularly to replacing physical controls with virtual controls of the electronic devices utilizing low capacitive sensing.

Capacitive sensing is a technology, based on capacitive coupling (i.e., transfer of energy by displacement of a current induced by an electric field), that detects and measures conductivity associated with conductive materials or has a dielectric (i.e., property of an electrical insulating material) that is different from air. Capacitive sensing systems include: mutual capacitance, where an object (e.g., finger, conductive stylus) alters mutual coupling between rows and columns of electrodes that are scanned sequentially; and self or absolute capacitance, where the object loads the sensor or increases the parasitic capacitance to ground. In basic capacitive sensing technology, only one side of an insulator is coated with conductive material. A small voltage is applied to the conductive layer, resulting in a uniform electrostatic field. When a conductor touches the uncoated surface, a capacitor dynamically forms. Due to the sheet resistance of the surface, each corner is measured to have a different effective capacitance. The sensor's controller determines the location of the touch indirectly from the change in the capacitance as measured from the four corners of the panel: the larger the change in capacitance, the closer the touch is to that corner. For example, a person touches a touch a lamp that is touch sensitive. The lamp alone has a fixed capacitance, (i.e., a circuit connected to the lamp would utilize a specified number of electrons to charge or fill the lamp with electrons). The person also includes a fixed capacitance, and when the person interacts with the lamp, the capacitance of the person add to the capacitance of the lamp. The circuit connected to the lamp detects the change in capacitance and registers the interaction.

With respect to a touchscreen, capacitive touch sensors create an electric field above the glass of the touchscreen that are associated with an image map denoting a sensing region of the touchscreen. Within the touchscreen, sensing circuitry detects minute changes in the electric field (i.e., changes in the touchscreen electrode's capacitance values) within the sensing region. Analysis and filtering of the changes in the image map result in an extraction of a signal from noise. Algorithms are applied to the signal to identify objects of interest that interact and/or are near the surface of the touchscreen. The capacitive touch sensors also detect motion which is tracked with respect to the touchscreen and the image map.

SUMMARY

Aspects of the present invention disclose a method, computer program product, and system for controlling a computing device without mechanical buttons, the method comprises one or more computer processors detecting an interaction with a touch capacitive sensing surface on a computing device. The method further comprises one or more computer processors determining that the detected interaction includes at least three interactions including at least two different touch capacitive sensing surfaces. The method further comprises one or more computer processors determining a virtual control button to display based on the detected interaction. The method further comprises one or more computer processors displaying the determined virtual control button to the user. The method further comprises one or more computer processors receiving an interaction with the displayed virtual control button. The method further comprises one or more computer processors implementing, an action associated with the determined virtual control button based on the received interaction.

DETAILED DESCRIPTION

Embodiments of the present invention recognize a computing device utilizes mechanical buttons (i.e., a physical switch made out of a hard material such as a metal or plastic that may be moved through a change in position and/or depressed to change the state of a relay) in order to: control one or more aspects of the computing device, initiate/change a process, and/or enter information. In addition, embodiments of the present invention recognize that a computing device may also utilize a capacitive sensing touchscreen and/or sensor to receive input, control an aspect, initiate/change the process, enter information, and/or to alter a state of the computing device. Embodiments of the present invention recognize that the placement of the mechanical buttons on a computing device may be limiting, awkward, decrease security options, and may accidentally initiate in response to a user interaction. Embodiments of the present invention replace mechanical buttons with capacitive sensing surfaces that allow customization of placement and function or virtual buttons on a computing device. By allowing for personal customization by each individual user, embodiments of the present invention provide a more intuitive, robust, and secure computing device that conforms to user preferences, thereby making the computing device easier to use.

Figure 1:
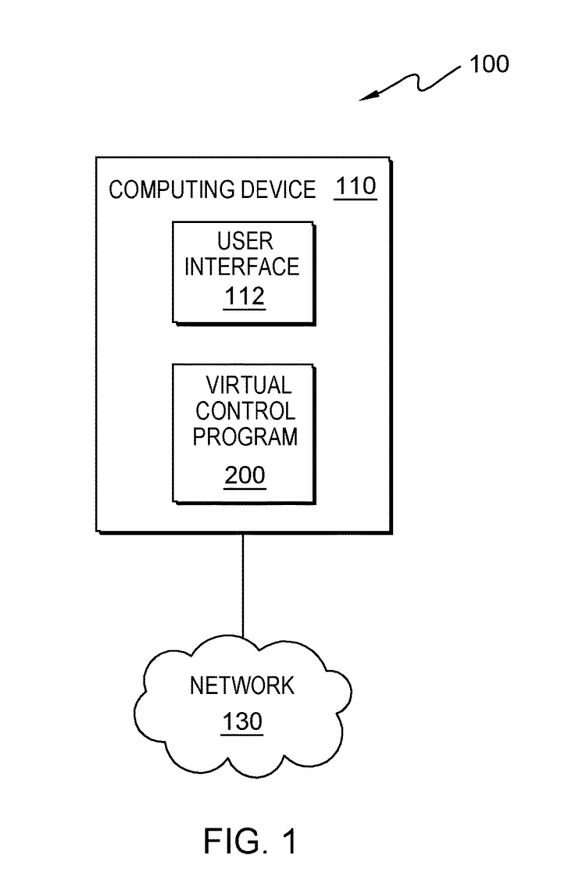
FIG. 1 is a functional block diagram illustrating a capacitive sensing computing environment, in accordance with an embodiment of the present invention.

The present invention will now be described in detail with reference to the Figures. FIG. 1 is a functional block diagram illustrating a capacitive sensing computing environment, generally designated 100, in accordance with one embodiment of the present invention. FIG. 1 provides only an illustration of one embodiment and does not imply any limitations with regard to the environments in which different embodiments may be implemented.

In the depicted embodiment, capacitive sensing computing environment 100 includes computing device 110 and server 120 interconnected over network 130. Capacitive sensing computing environment 100 may include additional computing devices, mobile computing devices, servers, computers, storage devices, or other devices not shown.

Computing device 110 may be any electronic device or computing system capable of processing program instructions and receiving and sending data utilizing touch capacitive sensing in place of mechanical buttons. In some embodiments, computing device 110 may be a laptop computer, a tablet computer, a netbook computer, a personal computer (PC), a desktop computer, a personal digital assistant (PDA), a smart phone, a remote control, a wearable device, or any programmable electronic device capable of communicating with network 130. In general, computing device 110 is representative of any electronic device or combination of electronic devices capable of executing machine readable program instructions as described in greater detail with regard to FIG. 7, in accordance with embodiments of the present invention. In one embodiment, the body of computing device 110 comprises one or more capacitive materials (e.g., glass, metal and glass, composite capacitive material, etc.). In another embodiment the body of computing device 110 comprises a combination of one or more capacitive materials and one or more non-capacitive materials (e.g., insulator, rubber, plastic, etc.). Computing device 110 contains user interface 112 and virtual control program 200. Computing device 110 is described in more detail in FIG. 3.

User interface 112 is a program that provides an interface between a user of computing device 110 and a plurality of applications that reside on computing device 110 (e.g., e-mail clients, Internet browsers, voicemail, telephone, games, etc.) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., front touchscreen 114, external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements.

User interface 112 sends and receives information to virtual control program 200 in response to user interactions and selections that occur via front touchscreen 114, and/or front touchscreen 114, left capacitive surface 116, right capacitive surface 118, top capacitive surface 122, bottom capacitive surface 124, and back capacitive surface 126. For example, virtual control program 200 activates user interface 112 is response to a combination of user interactions with front touchscreen 114, left capacitive surface 116, right capacitive surface 118, top capacitive surface 122, bottom capacitive surface 124, and back capacitive surface 126. Virtual control program 200 receives customizations (e.g., activation and deactivations) of capacitive sensing areas associated with left capacitive surface 116, right capacitive surface 118, top capacitive surface 122, bottom capacitive surface 124, and back capacitive surface 126 from a user via user interface 112.

Network 130 may be a local area network (LAN), a wide area network (WAN) such as the Internet, a wireless local area network (WLAN), any combination thereof, or any combination of connections and protocols that will support communications between computing device 110 and other computing devices and servers (not shown), in accordance with embodiments of the inventions. Network 130 may include wired, wireless, or fiber optic connections.

Virtual control program 200 is a program that replaces mechanical buttons with virtual controls utilizing capacitive sensing through the device body of computing device 110. Virtual control program 200 allows a user to customize virtual control buttons to correspond with preferences of the user, thereby increasing security and accessibility. In one embodiment, a user via user interface 112 customizes virtual control program 200 by defining continuous motions with capacitive surfaces and/or defining a series of multiple interactions and specifies an action or virtual button control for control of computing device 110. In another embodiment, virtual control program 200 sets default continuous motions with capacitive surfaces and/or defining a series of multiple interactions assigned to an action that controls computing device 110 for utilization by the user (e.g., factory installed settings). In some other embodiment, the user utilizes a combination of customized and default actions to control computing device 110 via virtual control program 200. Virtual control program 200 monitors front touchscreen 114, left capacitive surface 116, right capacitive surface 118, top capacitive surface 122, bottom capacitive surface 124, and back capacitive surface 126, for changes in capacitance. Upon detection of a change in the capacitance to one of front touchscreen 114, left capacitive surface 116, right capacitive surface 118, top capacitive surface 122, bottom capacitive surface 124, and back capacitive surface 126, virtual control program 200 continues to monitor for additional capacitance value changes to occur in a defined sequence (e.g., back capacitive surface 126 to right capacitive surface 118 to front touchscreen 114, front touchscreen 114 to bottom capacitive surface 124 to back capacitive surface 126, etc.). Virtual control program 200 identifies a defined sequence of interactions that match the received sequence of changes in capacitance, which identifies a specific virtual control for operating an aspect (e.g., power, volume, home button, back button, etc.) of computing device 110 previously associated with a mechanical button. Virtual control program 200 displays the identified specific virtual control to the user via user interface 112 for further utilization. In the depicted embodiment, virtual control program 200 resides on computing device 110. In one embodiment, virtual control program 200 is a standalone program. In another embodiment, virtual control program 200 is included within user interface 112. In some other embodiment, virtual control program 200 is included as part of the operating system. Virtual control program 200 sends and receives virtual controls and information to and from user interface 112 for display and use by a user.

Figure 3:
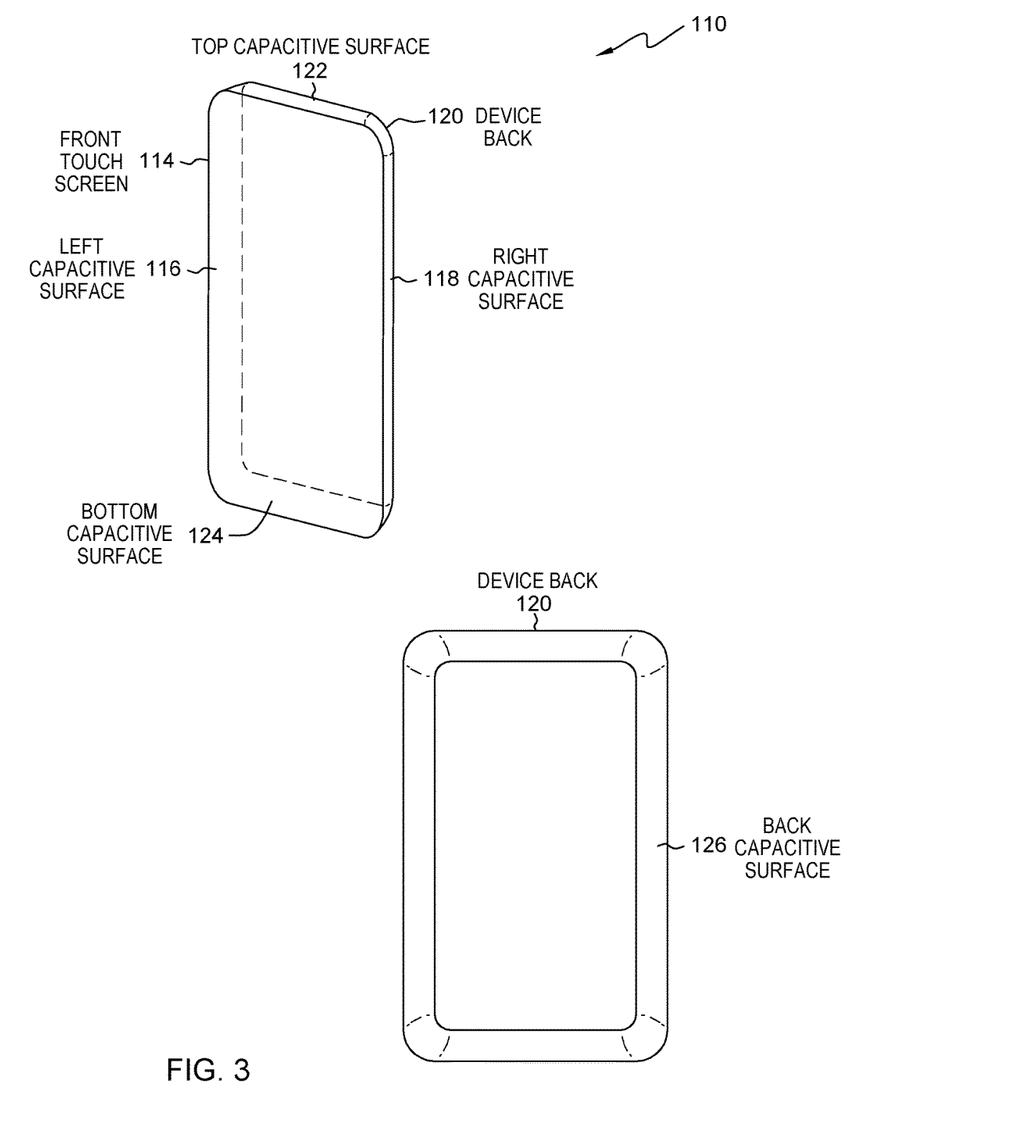
FIG. 3 depicts a physical configuration of an example of a computing device that replaces physical buttons with capacitive sensing surfaces within the capacitive sensing computing environment of FIG. 1, in accordance with an embodiment of the present invention.

An example physical configuration of computing device 110 that replaces mechanical buttons with capacitive sensing surfaces (e.g., front touchscreen 114, left capacitive surface 116, right capacitive surface 118, top capacitive surface 122, bottom capacitive surface 124, and back capacitive surface 126) in accordance with an embodiment of the present invention is depicted in FIG. 3. In one embodiment, computing device 110 includes rounded edges between surfaces, in which the body of computing device 110 maintains a smooth uniform transition between the back, front, and sides (e.g., front, back, and sides do not exhibit a distinct transition between surfaces). For example the edges of computing device 110 are beveled edges in which the edges are not perpendicular to the faces of computing device 110. The rounded edges of computing device 110 allow for a smooth single distinct motion to occur (e.g., virtual control program 200 tracks a single movement between multiple capacitive surfaces for utilization). While the rounded edges of computing device 110 are continuous and/or perceived as continuous, virtual control program 200 assigns a geometric plane (e.g., virtual overlay onto computing device 110) that distinguishes features of computing device 110 associated with a front, sides, and a back surface to provide distinct selectable areas. In another embodiment, computing device 110 includes defined edges that separate the front, side, and back surfaces (e.g., front, sides, and back joined by a defined angle that forms an identifiable and distinct edge between surfaces). The defined edges of computing device 110 receive individual motions respective to each surface over which interactions occur, which virtual control program 200 evaluates and joins for utilization. In the depicted embodiment, the physical configuration of computing device 110 includes front touchscreen 114, left capacitive surface 116, right capacitive surface 118, top capacitive surface 122, bottom capacitive surface 124, device back 120, and back capacitive surface 126.

Front touchscreen 114 is a capacitive touchscreen combined with an electronic visual display. Front touchscreen 114 registers changes in electrical currents running through front touchscreen 114 through a layer of capacitive or electricity-storing material based on capacitors within front touchscreen 114. The capacitors within front touchscreen 114 are arranged according to a coordinate system that creates a coordinate grid, which tracks movement and allows a user to control and manipulate computer programs with a special stylus and/or a finger. Left capacitive surface 116, right capacitive surface 118, top capacitive surface 122, bottom capacitive surface 124, and back capacitive surface 126 are touch capacitive sensing surfaces that do not include a display aspect, but include a coordinate grid system that joins with the coordinate grid of front touchscreen 114. In the depicted embodiment, back capacitive surface 126 is a single surface the covers a portion of device back 120. In another embodiment, back capacitive surface 126 encompasses the entirety of device back 120. In some other embodiment, back capacitive surface 126 is divided into multiple areas (e.g., panels, strips, smaller capacitive areas) similarly to left capacitive surface 116, right capacitive surface 118, top capacitive surface 122, and bottom capacitive surface 124 (e.g., four individual capacitive surfaces that coincide with device edges that are on back capacitive surface 126).

In one embodiment the entirety of left capacitive surface 116, right capacitive surface 118, top capacitive surface 122, bottom capacitive surface 124, and back capacitive surface 126 are active (i.e., virtual control program 200 monitors and registers changes to capacitance values) in addition to front touchscreen 114 (e.g., default factory setting by the manufacturer). In another embodiment, at least a portion of back capacitive surface 126 (e.g., bottom half, bottom quarter, lower right quadrant, etc.) and at least a portion of one of left capacitive surface 116, right capacitive surface 118, top capacitive surface 122, and/or bottom capacitive surface 124 are active in addition to front touchscreen 114. In another embodiment, the user of computing device 110 via user interface 112, customizes computing device 110 and identifies at least one of: left capacitive surface 116, right capacitive surface 118, top capacitive surface 122, and bottom capacitive surface 124 as active. For example, right capacitive surface 118 is set to active, and left capacitive surface 116, top capacitive surface 122, and bottom capacitive surface 124 are set to inactive. In some other embodiment, the user of computing device 110 via user interface 112 specifies portions of at least one portion of left capacitive surface 116, right capacitive surface 118, top capacitive surface 122, bottom capacitive surface 124, and back capacitive surface 126 to be active. For example a user deactivates (e.g., sets a capacitive surface to inactive and does not register changes in capacitance) both left capacitive surface 116, top capacitive surface 122, and the upper portion of right capacitive surface 118 (e.g., upper half, divides the side into two equal portions). The user activates the entirety of bottom capacitive surface 124, a portion of right capacitive surface 118 (e.g., bottom half of the right capacitive surface 118 which includes the bottom right corner of computing device 110), and the back half (e.g., lower two quadrants) of back capacitive surface 126. In yet some other embodiment, the user of computing device 110 combines the aforementioned customizations and identifies at least one capacitive surface and/or a portion of at least one capacitive surface as active.

In one embodiment, left capacitive surface 116, right capacitive surface 118, top capacitive surface 122, and bottom capacitive surface 124 are assigned with respect to an internal gyroscope and orientation rather than to an actual fixed physical configuration of computing device 110 (i.e., the top, bottom, left, and right are not assigned to a specific side of computing device 110, and front touchscreen 114 changes orientation and the display viewed by the user based on the internal gyroscope). For example, a user rotates computing device 110 ninety degrees to the right, and the long edges of computing device 110 previously associated with left capacitive surface 116 and right capacitive surface 118 change to be associated with top capacitive surface 122 and bottom capacitive surface 124 respectively, and the short edges of computing device 110 previously associated with top capacitive surface 122 and bottom capacitive surface 124 change to right capacitive surface 118 and left capacitive surface 116 respectively (i.e., virtual assignment of position with respect to computing device 110). In another embodiment, the orientation of computing device 110 is fixed (e.g., orientation of front touchscreen 114 does not rotate with the internal gyroscope) and left capacitive surface 116, right capacitive surface 118, top capacitive surface 122, and bottom capacitive surface 124 are assigned to fixed positions (i.e., the top, bottom, right, and left designators are assigned to a specific physical location on computing device 110). For example, the automatic screen rotation setting is set to not rotate (e.g., disabled, set to off, etc.), therefore the display remains fixed and the display does not update to correspond with user movements of computing device 110.

Figure 2:
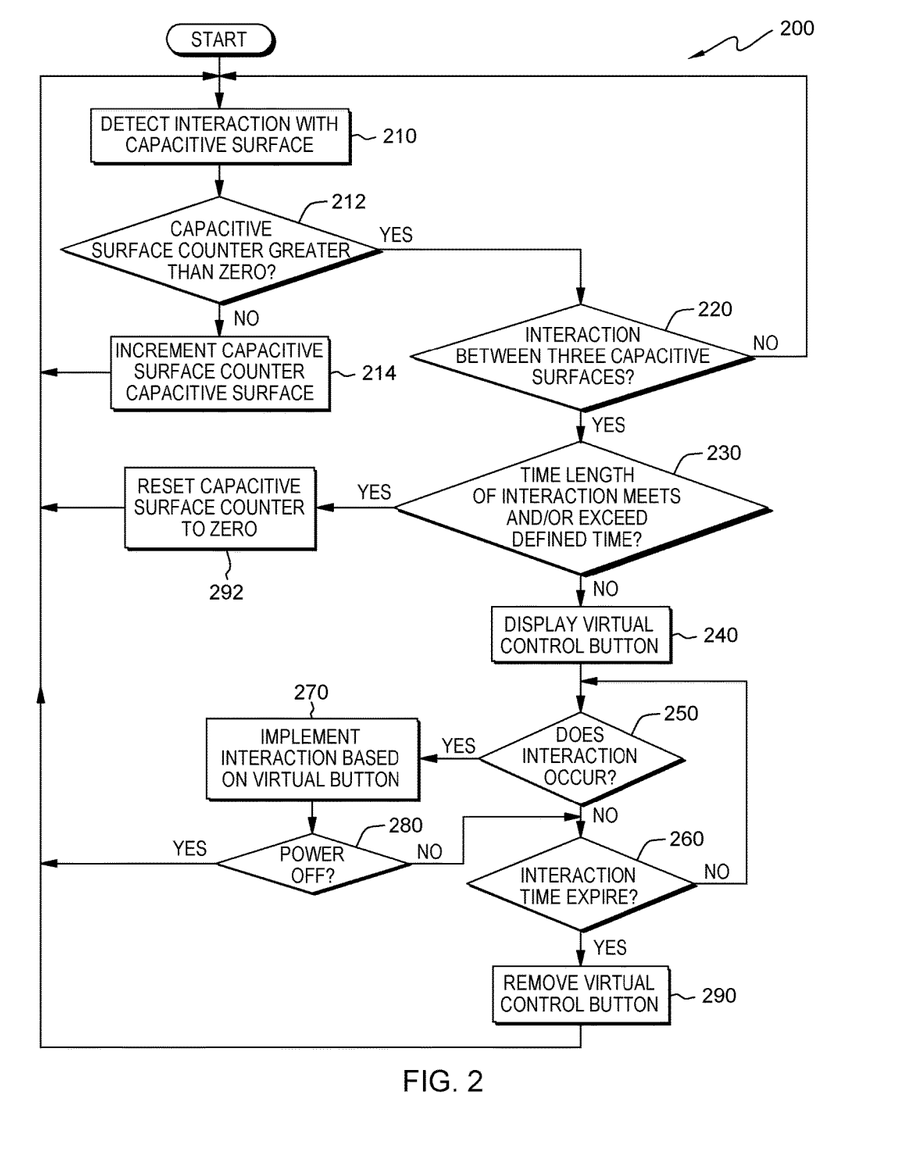
FIG. 2 is a flowchart depicting operational steps of a virtual control program, on a computing device within the capacitive sensing computing environment of FIG. 1, for replacing physical buttons with virtual controls for the computing device that utilizes capacitive sensing, in accordance with an embodiment of the present invention.

FIG. 2 is a flowchart depicting operational steps of virtual control program 200, a program for replacing mechanical buttons with virtual controls for computing device 110 that utilizes capacitive sensing, in accordance with an embodiment of the present invention. Virtual control program 200 is an active background application that runs continuously while power is available (e.g., battery is charged, computing device 110 connects to a power source for operation and/or charging) to operate computing device 110. As virtual control program 200 controls turning on (e.g., waking up) computing device 110 to full functionality for use by a user instead of mechanical buttons, virtual control program 200 remains active while computing device 110 is placed in alternative states by a user and/or settings associated with computing device 110 (e.g., a power savings mode, turned off main functions, a hibernation mode, power off of display, etc.). In other words, a low level voltage is continuously supplied while available to maintain touch capacitive sensing and operate virtual control program 200 in order to recognize changes in capacitance and initiate functions of computing device 110 previously associated with mechanical buttons (e.g., low level power is always on, even when computing device 110 is placed in an off state). If power is not available (i.e., battery is depleted), a user connects computing device 110 to a power source for use and/or charges the battery to a sufficient level prior to use in order to initiate virtual control program 200 and utilize computing device 110. During regular operation, a battery connected to computing device 110 applies a low level voltage via internal circuitry to a conductive layer associated with front touchscreen 114, left capacitive surface 116, right capacitive surface 118, top capacitive surface 122, bottom capacitive surface 124, and back capacitive surface 126, which results in a uniform electrostatic field through with the user interacts to initiate virtual control program 200.

In step 210 virtual control program 200 detects an interaction with a capacitive surface of computing device 110. Virtual control program 200 monitors the capacitance levels associated with front touchscreen 114, left capacitive surface 116, right capacitive surface 118, top capacitive surface 122, bottom capacitive surface 124, and back capacitive surface 126 for changes. Virtual control program 200 registers the change in capacitance as an interaction with a capacitive surface. Virtual control program 200 also identifies a location associated with the interaction based on the coordinate grid associated with the capacitive surfaces of computing device 110 (e.g., back capacitive surface 126). In one embodiment, virtual control program 200 identifies a single set of coordinates associated with the interaction. For example, back capacitive surface 126 includes four separate quarter inch wide strips that follow along the edges of device back 120. A user via user interface 112, during customization of computing device 110 deactivates three of the strips, but activates the fourth strip along the right edge of device back 120 as back capacitive surface 126. As only the right edge of device back 120 is active, virtual control program 200 identifies coordinates for only interactions through the quarter inch strip along the right edge of device back 120 (e.g., back capacitive surface 126). Virtual control program 200 stores the location of the single set of coordinates.

In another embodiment, virtual control program 200 detects multiple simultaneous interactions and identifies multiple sets of coordinates. For example back capacitive surface 126 is active along all edges of device back 120. A user picks up computing device 110, and virtual control program 200 detects interactions at multiple points in which the palm and fingers of the user are in contact with back capacitive surface 126. In some embodiments, virtual control program 200 discards coordinates and/or portions of coordinates that exceed a maximum size. For example, virtual control program 200 discards coordinates that cover an area larger than the first joint of a finger and/or exceed the width of a finger or stylus (i.e., discards coordinates associated with points of contact associated with the palm of the user). In some other embodiment, virtual control program 200 creates a map based on the capacitance values and matches the map to stored capacitance values associated with known hand positions. Utilizing the map and known hand positions, virtual control program 200 identifies which hand is holding computing device 110, and discards coordinates that do not correspond to a finger. In some other embodiments, virtual control program 200 discards coordinates that are not within a specified distance of an edge of computing device back 120. For example, virtual control program 200 discards coordinates that are over an inch from the edge of device back 120, while maintaining coordinates that are within an inch of the edges of device back 120. In yet some other embodiment, virtual control program 200 combines one or more of the aforementioned embodiments to identify a single set of coordinates or multiple sets of coordinates. Virtual control program 200 stores the locations of the multiple sets of coordinates for further utilization.

Virtual control program 200 continuously monitors the capacitive surfaces of computing device 110 for additional interactions (e.g., detects changes to capacitance) within a capacitive surface of computing device 110. For each additional interaction (i.e., identified increase in capacitance), virtual control program 200 identifies a corresponding set of coordinates associated with the location of the increase in capacitance for further utilization.

In decision 212, virtual control program 200 determines whether a capacitive surface counter is greater than zero. The capacitive surface counter is an integer that virtual control program 200 utilizes to track (e.g., count) the number of interactions that occur associated with a detected interaction, continuous motion and/or a series of interactions. Virtual control program 200 retrieves the capacitive surface counter associated with the detected interaction. Virtual control program 200 determines whether the value of the capacitive surface counter is greater than zero. If virtual control program 200 determines the value of the capacitive surface counter is not greater than zero (i.e., capacitive surface counter is equal to zero), then virtual control program 200 determines the interaction is a first interaction which starts a continuous motion and/or the first interaction within a defined sequence of interactions. If virtual control program 200 determines the value of the capacitive surface counter is greater than zero (i.e., prior detections have occurred), then virtual control program 200 determines the interaction is not a first interaction and begins further analysis to determine whether the interaction is part of a continuous motion and/or part of a defined sequence of interactions.

If virtual control program 200 determines the capacitive surface counter is greater than zero (decision 212, yes branch), then virtual control program 200 determines whether a motion between three capacitive surfaces occurs (decision 220). If virtual control program 200 determines the capacitive surface counter is not greater than zero (decision 212, no branch), then virtual control program 200 increments the capacitive surface counter (step 214). In step 214 virtual control program 200 increases the value of the capacitive surface counter from zero to one. Virtual control program 200 returns to detect a second interaction with the capacitive surfaces (step 210).

Figure 4:
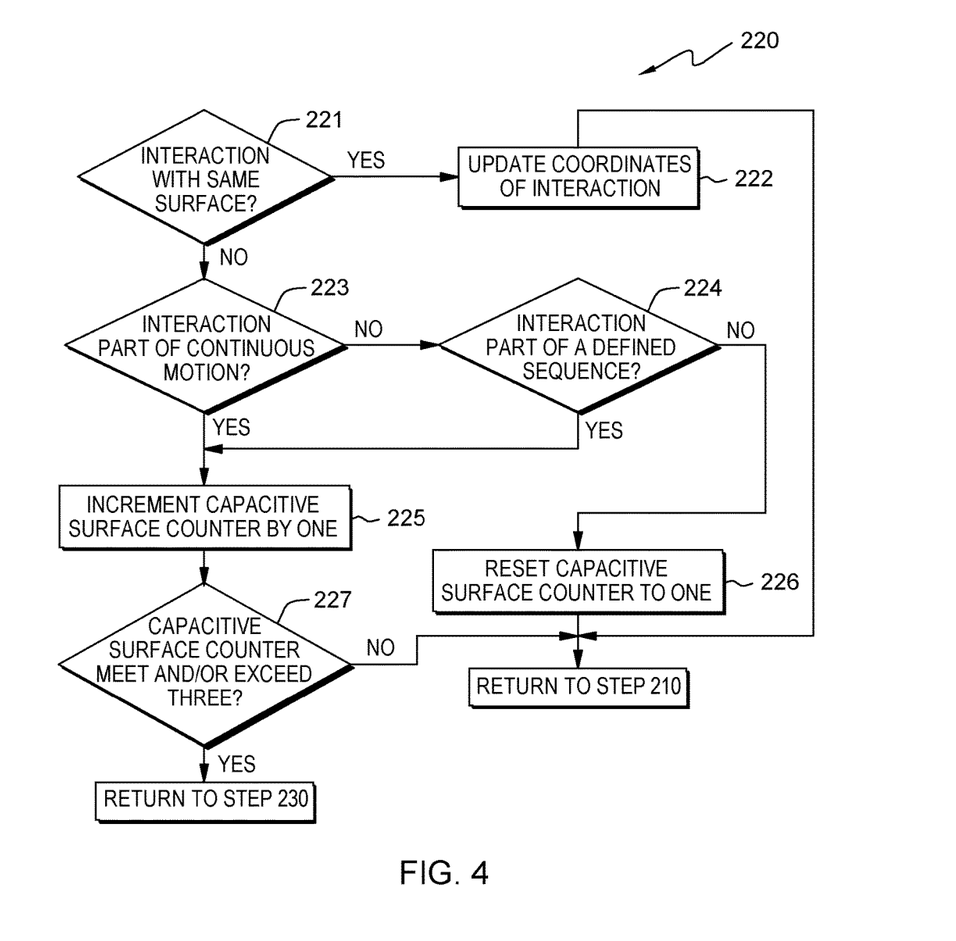
FIG. 4 is a flowchart depicting additional operational steps of the step to determine whether a motion takes place between three capacitive surfaces within the virtual control program, in accordance with an embodiment of the present invention.

In decision 220, virtual control program 200 determines whether an interaction between three capacitive surfaces occurs. If virtual control program 200 determines the interaction between three capacitive surfaces occurs (decision 220, yes branch), then virtual control program 200 determines whether the time length of the interaction meets and/or exceeds the defined time (decision 230). If virtual control program 200 determines the interaction between three capacitive surfaces does not occur (decision 220, no branch), then virtual control program 200 returns to detect an interaction (e.g., second interaction, third interaction, etc.) with a capacitive surface (step 210). FIG. 4 depicts and describes the operational steps of decision 220 for determining whether an interaction between three capacitive surfaces occurs in greater detail.

In decision 221, virtual control program 200 determines whether the coordinates of the additional interaction are within the same capacitive surface and/or surfaces as the stored interaction. Virtual control program 200 identifies the coordinates of the additional interaction. Virtual control program 200 compares the coordinates of the additional interaction with the coordinates of the stored interaction to determine whether the capacitive surfaces associated with the interactions are the same. For example, the user changes a handhold by readjusting finger placement on the edges of computing device 110, but does not touch a new capacitive surface of computing device 110. Therefore, virtual control program 200 determines the additional interaction takes place in the same capacitive surfaces as the stored interactions. Virtual control program 200 updates the coordinates of the stored interaction to correspond to the updated finger placement associated with the new handhold. In another example, the user changes handholds by rotating computing device 110 ninety degrees, thereby changing finger placement from the long edges of computing device 110 (e.g., left capacitive surface 116 and right capacitive surface 118) to the short edges of computing device 110 (e.g., top capacitive surface 122 and bottom capacitive surface 124). Therefore, virtual control program 200 determines the additional interaction takes place in a different capacitive surface than the stored interactions.

Virtual control program 200 determines an interaction occurs with a different capacitive sensing surface upon detecting a movement within the geometric plane that changes from one surface (e.g., a first plane) to another surface (e.g., a second plane). For example, the geometric plane is a virtual overlay onto computing device 110 that distinguishes features of computing device 110 associated with a front, sides, and a back surface to provide distinct selectable areas. As the user moves across the geometric planes by moving a finger from the back surface to the side, virtual control program 200 detects a change in the interaction with the geometric planes and identifies a first interaction (e.g., portion of the geometric plane associated with the back surface) and a second interaction (e.g., portion of the geometric plane associate with the side surface). In one embodiment, the user continues the motion and returns to the back surface. As the back surface is not the same as the side surface within the geometric plane, virtual control program 200 detects a third interaction (i.e., allows reuse of a surface within a sequence of interactions and/or continuous movement). In another embodiment the user continues the motion to the front touchscreen, and again virtual control program 200 detects a third interaction (i.e., third surface is different from the first and second surfaces). Alternatively, the user continues the motion along the side surface moving from the middle to the top, and virtual control program 200 does not detect a third interaction as the interaction with the geometric plane remains within the same surface.

If virtual control program 200 determines the coordinates of the additional interaction are within the same capacitive surface and/or surfaces as the stored interaction (decision 221, yes branch), then virtual control program 200 updates the coordinates of the stored interaction to the new coordinates (step 222). If virtual control program 200 determines the coordinates of the additional interaction are not within the same capacitive surface and/or surfaces as the stored interaction, then virtual control program 200 determines whether the additional interaction is part of a continuous motion (decision 223). Additionally, as the interaction does not occur in a different capacitive surface, virtual control program 200 does not change the value of the capacitive surface counter (i.e., maintains the existing value).

In step 222, virtual control program 200 updates the coordinates of the stored interaction to the new coordinates. Virtual control program 200 utilizes the last stored set of coordinates of the stored interaction in as the basis of comparison for the subsequent determination. Upon updating the coordinates, virtual control program 200 returns to detect an additional interaction with a capacitive surface (step 210).

In decision 223, virtual control program 200 determines whether the additional interaction is part of a continuous motion (e.g., predefined or user customized). Virtual control program 200 compares the stored set of coordinates with the additional set of coordinates and determines whether the coordinates are adjacent. In one embodiment, virtual control program 200 determines the coordinates are adjacent as the movement is continuous across multiple capacitive surfaces. For example as the finger of the user moves between two surfaces which includes the actual or virtual edge between capacitive surfaces. Virtual control program 200 tracks the coordinates of the area encompassed by the motion via the coordinate grid. Virtual control program 200 does not identify a break in the points of the coordinate grid traversed by the finger of the user between the two surfaces, and therefore virtual control program 200 identifies the motion as a continuous motion between two adjacent capacitive surfaces. In another embodiment, virtual control program 200 determines the coordinates are adjacent by analyzing the coordinates of intersecting coordinate grids. For example, when moving from a horizontal surface to a vertical surface which an intersecting sharp edge, a slight break occurs between two sets of coordinates as the user transitions between capacitive surfaces. Virtual control program 200 analyzes the coordinates of the two points by combining the coordinate grids into a single grid from which virtual control program 200 determines adjacency.

If virtual control program 200 determines that the additional interaction is part of a continuous motion (decision 223, yes branch), then virtual control program 200 increments the capacitive surface counter by one (step 225). For example, the capacitive surface counter increases from one to two, two to three, etc., depending upon the number of prior iterations. If virtual control program 200 determines that the additional interaction is not part of a continuous motion (i.e., coordinates are not adjacent), then virtual control program 200 determines whether the additional interaction is part of a defined sequence of capacitive surface interactions (decision 224). For example, a user places a finger on the middle of back capacitive surface 126, but rather than sliding the finger across back capacitive surface 126 to right capacitive surface 118, the user picks up and moves the finger to the bottom corner, which causes a break (e.g., gap, space, etc.) in the coordinates traversed by the finger. While back capacitive surface 126 is physically adjacent to right capacitive surface 118, the coordinates are no longer directly adjacent, and therefore virtual control program 200 determines the motion is not a continuous movement.

In decision 224, virtual control program 200 determines whether the additional interaction is part of a defined sequence of capacitive surface interactions. In one embodiment, the defined sequence of capacitive surface interactions are predefined (e.g., default). In another embodiment, the user of computing device 110 programs virtual control program 200 through user interface 112 with sequences of interactions. The user identifies a series of interactions with the capacitive surfaces of computing device 110 and assigns an action (e.g., turn on display, turn off display home button, the defined sequence links to a specific action). By defining a series of interactions (e.g., adjacent, non-adjacent, combination of adjacent and non-adjacent, etc.) and assigning the action to enable a function, the user increases the security of computing device 110. For example another user will not have ready access to the customized sequence of interactions that enable the action similar and therefore will not know the proper sequence of interactions to operate functions associated with computing device 110.

Additionally the user improves utilization by customizing a sequence of interactions to personal preferences. Virtual control program 200 compares the location of the stored interaction and the location of the additional interaction with stored instances of defined sequences of motions and/or interactions between capacitive surfaces for one or more matches (e.g., detected interactions match portions of stored user defined sequences of interactions). For example a user defines a sequence as right capacitive surface 118, then left capacitive surface 116, followed by bottom capacitive surface 124 to enable the button associated with the action to power on for computing device 110. The user defines a second sequence as left capacitive surface 116, then right capacitive surface 118, followed by bottom capacitive surface 124 with the action to display the volume control for computing device 110. While utilizing computing device 110, the user begins to enter a sequence of left capacitive surface 116, then right capacitive surface 118. Virtual control program 200 identifies one match (e.g., sequence to display the volume control) for further use in the evaluation of additional detected interactions. While both defined sequences include left capacitive surface 116, and right capacitive surface 118, virtual control program 200 determines the order of the detected interactions only matches the order of one of the defined sequences. Continuing the example, the user enters a sequence of left capacitive surface 116, then right capacitive surface, and top capacitive surface 122. Virtual control program 200 does not identify a match between defined sequences and the received series of interactions. Therefore virtual control program 200 determines the additional interaction is not part of a defined sequence of capacitive surface interactions.

If virtual control program 200 determines the additional interaction is part of a defined sequence of capacitive surface interactions (decision 224, yes branch), then virtual control program 200 increments the capacitive surface counter by one (step 225). If virtual control program 200 determines the additional interaction is not part of a defined sequence of capacitive surface interactions (decision 224, no branch), then virtual control program 200 resets the capacitive surface counter to one (step 226). Virtual control program 200 identifies the additional interaction as a first interaction of a new sequence and/or continuous motion. Upon completion of resetting the capacitive surface counter to one, virtual control program 200 returns to detect another interaction with a capacitive surface (step 210).

In decision 227, virtual control program 200 determines whether the capacitive surface counter meets and/and or exceeds three. If virtual control program 200 determines the capacitive surface counter meets and/and or exceeds three (decision 227, yes branch), then virtual control program 200 determines whether the time length of the interaction meets and/or exceeds a defined time (decision 230). If virtual control program 200 determines the capacitive surface counter does not meet and/and or exceed three (decision 227, no branch), then virtual control program 200 returns to detect another interaction with a capacitive surface (step 210).

In decision 230, virtual control program 200 determines whether the time length of the interaction meets and/or exceeds a defined time. Virtual control program 200 initializes and starts a timer (i.e., sets timer to zero and begins timing the length of time over which the interaction occurs) upon detection of an interaction. The timer counts a running time (i.e., the clock time is real time and does not stop incrementing until virtual control program 200 identifies a condition occurs that is associated with a stop condition, such as completing a sequence of defined interactions). Virtual control program 200 compares the running time with the defined time associated with the continuous motion and/or set sequence of interactions. In one embodiment, virtual control program 200 utilizes a default time set by the manufacturer associated with the continuous motion and/or set sequence of interactions (e.g., average time to receive a continuous motion and/or sequence of defined interactions). In another embodiment, virtual control program 200 sets the defined time based on a customization identified by the user. In one embodiment, virtual control program 200 utilizes a user customized defined time that is a standard time for all continuous motions and/or defined sequences of interactions (e.g., sets a time different than the default). In another embodiment, virtual control program 200 utilizes a user customized defined time for each custom continuous motion and/or defined sequence of interactions based on a time to complete each customization. For example, as the user creates the custom continuous motion and/or defined sequence of interactions, virtual control program 200 records the amount of time the user takes to complete the continuous motion and/or defined sequence of interactions. Virtual control program 200 allows the user to adjust the recorded defined time and/or utilize the recorded time for the defined time. Through virtual control program 200, the user may select one or more of the following options to adjust the default defined time, custom defined time, and/or the recorded defined time include at least options to: identify a tolerance to identify a minimum and maximum defined time of an interaction, reduce the defined time, and increase the defined time. Based upon the comparison of the running time with the defined time, virtual control program 200 determines whether the time length of the interaction meets and/or exceeds a defined time.

If virtual control program 200 determines the time length of the interaction meets and/or exceeds a defined time (decision 230, yes branch), then virtual control program 200 resets the capacitive surface counter to zero (step 292). If virtual control program 200 determines the time length of the interaction does not meets and/or exceeds the defined time (decision 230, no branch), then virtual control program 200 displays a virtual control button (step 240).

In step 240, virtual control program 200 displays a virtual control button. Virtual control program 200 identifies a virtual control button based upon identifying a match between the detected interactions with the continuous motions and/or defined sequences of interactions within memory. In one embodiment, virtual control program 200 identifies a virtual control button match solely based on at least three interactions with capacitive surfaces of computing device 110 (e.g., virtual control program 200 does not use exact coordinates to identify a virtual control button). In other words, the user may complete the interaction from any location within the surfaces that define the continuous motions and/or defined sequence of interactions, and virtual control program 200 will display the same virtual control button. In another embodiment, virtual control program 200 identifies a virtual control button match that is based on at least three interactions and a fixed location (i.e., the virtual control button is located within a specific area of computing device 110.) For example, the user defines a continuous motion of back capacitive surface 126, right capacitive surface 118, and front touchscreen 114 within the top right half of computing device 110 to initiate a volume control button. The user also defines a continuous motion of back capacitive surface 126, right capacitive surface 118, and front touchscreen 114 within the bottom right half of computing device 110 to initiate a home button. Therefore, virtual control program 200 identifies two possible virtual control buttons for display. To identify the correct virtual control button, virtual control program 200 utilizes an additional location component associated with the division of the capacitive surface to correctly identify the virtual control button. Continuing the example, the user interacts with the top right portion of computing device 110, and virtual control program 200 determines the user interaction matches the defined sequence of interactions associated with the volume control button.

In one embodiment, virtual control program 200 displays the virtual control button to the user via user interface 112 based on the coordinates of the last interaction (i.e., virtual control button is fluid and moves within front touchscreen 114 based on the last interaction and facilitates use by the user). Virtual control program 200 applies an offset to the coordinates of the last interaction in order to move the virtual control button a fixed distance from the last interaction. For example virtual control program 200 places the virtual control button to the left of the last location of the interaction. As virtual control program 200 places the virtual control button next to the last interaction, virtual control program 200 allows the user easier access to the virtual control button, a faster response time, and reduces accidental interactions. In another embodiment, virtual control program 200 displays the virtual control button to the user via user interface 112 based on a fixed location based on coordinates stored with the virtual control button (i.e., virtual control program 200 displays the virtual control button at the same fixed location each time and does not utilize the location of the last interaction for display). Virtual control program 200 stores the coordinates associated with the displayed virtual control button for further utilization.

In decision 250, virtual control program 200 determines whether an interaction occurs with the virtual control button. Virtual control program 200 monitors front touchscreen 114 for a change in capacitance. Virtual control program 200 receives coordinates via the coordinate grid that track the user interactions with front touchscreen 114. Virtual control program 200 compares the coordinates of the user interaction with the coordinates of the virtual control button. Virtual control program 200 determines an interaction occurs with the virtual control button when the coordinates of the user interaction intersect with the coordinates of the virtual control button.

If virtual control program 200 determines an interaction occurs with the virtual control butting (decision 250, yes branch), then virtual control program 200 implements the interaction based on the control button (step 270). If virtual control program 200 determines an interaction does not occur with the virtual control butting (decision 250, no branch), then virtual control program 200 determines whether the interaction time expires (decision 260).

In decision 260, virtual control program 200 determines whether an interaction time expires. The interaction time is a specified period of time that virtual control program 200 allows to elapse while waiting to receive a user interaction with the virtual control button. For example, upon displaying the virtual control button, virtual control program 200 sets a timer equal to the interaction time of five seconds and begins a countdown of the interaction time (e.g., decrements the interaction time). If the user does not interact with the virtual control button before the five seconds elapse (i.e., countdown of interaction time reaches zero), virtual control program 200 removes the virtual control button. If the user does interact with the virtual control button within the five seconds (i.e., countdown of interaction time is greater than zero), virtual control program 200 halts the countdown of the interaction time, and stores the user interaction with the virtual control button (e.g., registers a movement, selection, change in status, etc.).

In one embodiment, virtual control program 200 resumes the countdown of the interaction time in response to virtual control program 200 determining the user is no longer interacting with the virtual control button. In another embodiment, virtual control program 200 resets the interaction time to the initial value and begins the countdown of the interaction time again (i.e., allows the user time to change an input via the virtual control button.) In an alternate embodiment, virtual control program 200 determines the user enters a continuous motion to display a different virtual control button, while waiting for the elapsed time to expire. In response, virtual control program 200 sets the elapsed time to the maximum duration of the interaction time, which causes the interaction time to expire and removes the virtual control button prior to displaying a new instance of a virtual control button.

If virtual control program 200 determines the interaction time expires (decision 260, yes branch), then virtual control program 200 removes the virtual control button (step 290). If virtual control program 200 determines the interaction time does not expire (decision 260, no branch), then virtual control program 200 determines whether an interaction occurs with the virtual control button (decision 250).

In step 270, virtual control program 200 implements the interaction based on the virtual control button. Virtual control program 200 receives the interaction of the user with the virtual control button via user interface 112. Virtual control program 200 translates the received interaction with respect to the virtual control button, and implements the appropriate response. In some embodiments, if virtual control program 200 determines the displayed virtual control button involves turning on power, turning off power, or turning off the display. In response, virtual control program 200 sets the elapsed time to the maximum duration of the interaction time and causes the interaction time to automatically expire and removes the virtual control button. Additionally, in an embodiment in which virtual control program 200 implements an interaction to power off computing device 110 and/or restart computing device 110 (e.g., includes a brief power off to reset computing device 110), virtual control program 200 completes the power off sequence and/or ends processing of ongoing continuous motions and/or defined sequences of interactions (i.e., resets capacitive surface counter).

In decision 280 virtual control program 200 determines whether the interaction powers off computing device 110. Virtual control program 200 tracks and stores the type of virtual control button displayed and the user interaction (e.g., selection). If virtual control program 200 determines the virtual control button is associated with powering off computing device 110, and the user selects to power off computing device 110, then virtual control program 200 implements a shutdown process and terminates ongoing processes such as processing ongoing continuous motions and/or defined sequences of interactions. Virtual control program 200 enters a minimum operational state (i.e., limited function and lower power expenditure setting) until the user initiates a continuous motion and/or defines sequence associated with turning on computing device 110. If virtual control program 200 determines the virtual control button is any virtual control button other than power off computing device 110, and virtual control program 200 continues processing. In an alternate embodiment, the user selects to restart computing device 110. Virtual control program 200 implements the power off process, resets the capacitive surface counter to zero (step 292), and restarts computing device 110, thus returning to detect interactions with a capacitive surface (step 210).

If virtual control program 200 determines the interaction powers off computing device 110 (decision 280, yes branch), then virtual control program 200 resets the capacitive surface counter to zero (step 292). If virtual control program 200 determines the interaction does not power off computing device 110 (decision 280, no branch), then virtual control program 200 determines whether an interaction time expires (decision 260).

In step 290 virtual control program 200 removes the virtual control button. As the virtual control button is no longer active, the user is unable to initiate changes prior to re-entering the continuous motion and/or defined sequence of interactions. Virtual control program 200 displays the original image via user interface 112 without the virtual control button.

In step 292, virtual control program 200 resets the capacitive surface counter to zero. Upon virtual control program 200 determining, the time length of the interaction meets and/or exceeds a defined time, powers off computing device 110, and/or removes the virtual control button, virtual control program 200 completes and therefore the continuous motion and/or defined sequence of interaction is also complete. Virtual control program 200 resets the capacitive surface counter to zero to allow for virtual control program 200 to detect a new continuous motion and/or defined sequence of interactions (i.e., begins new processing of detected interactions). Virtual control program 200 returns to detect an interaction with a capacitive surface (step 210).

FIG. 5 depicts multiple examples of a user interaction with computing device 510 and virtual control program 200. It should be recognized that example FIGS. 5A-D are just a few variations of the multiple possible configurations and interactions. FIG. 5A depicts mobile computing environment 500 operating virtual control program 200 in which computing device 510 is off, as noted by the lack of a visual display on front touchscreen 502. While mobile computing device 510 is off, the battery of mobile computing device 510 applies a low level voltage to the capacitive surfaces, thereby allowing virtual control program 200 to detect and respond to interactions between the user and the capacitive surfaces. As depicted, mobile computing device 510 is held in the left hand of the user. Virtual control program 200 detects an interaction between the left hand of the user and the back capacitive surface (e.g. back capacitive surface 126), which includes an interaction with finger 506.

Figure 5A:
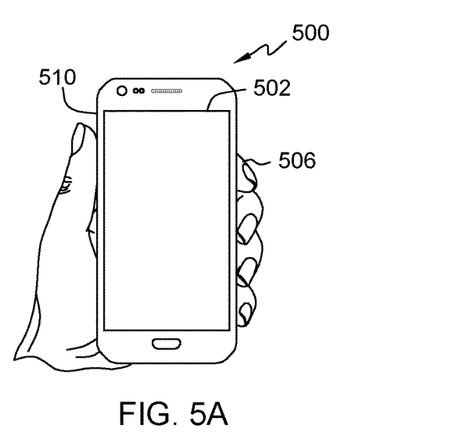
FIG. 5A depicts a mobile computing device in which the screen is set to an inactive display state, in accordance with an embodiment of the present invention.
Figure 5B:
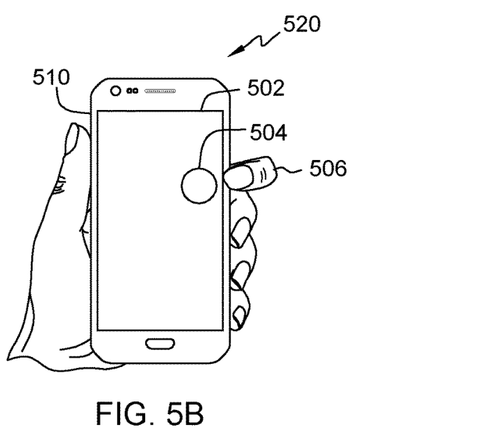
FIG. 5B depicts a mobile computing device operating the virtual control program that identifies an interaction with a user via the capacitive sensing surfaces via the right side of the computing device, in accordance with an embodiment of the present invention.

In FIG. 5B, mobile computing environment 520, the user slides finger 506 from the back capacitive surface to the right capacitive surface (right capacitive surface 118), and then to front touchscreen 502. Virtual control program 200 identifies a continuous motion that encompasses three capacitive surfaces. Virtual control program 200 identifies the continuous motion as a defined sequence to power on computing device 510. Virtual control program 200 displays power button 504 via front touchscreen 502 at the tip of finger 506. While power button 504 is placed in close proximity to finger 506, finger 506 does not connect to power button 504 without additional movement of finger 506 by the user.

Figure 5C:
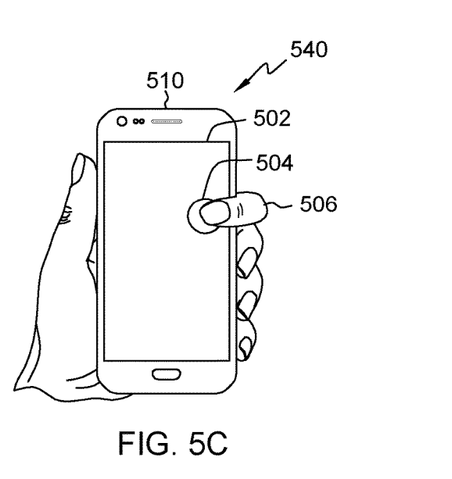
FIG. 5C depicts a mobile computing device operating the virtual control program that identifies the user interacts with a virtual control button to activate the display of the computing device, in accordance with an embodiment of the present invention.

In FIG. 5C, mobile computing device 540, virtual control program 200 detects finger 506 interacts with power button 504. Virtual control program 200 sends a command to power on computing device 510. Upon receipt of the power on command, virtual control program 200 sets the elapsed time to satisfy the condition in which the interaction time expires and virtual control program 200 removes power button 504.

Figure 5D:
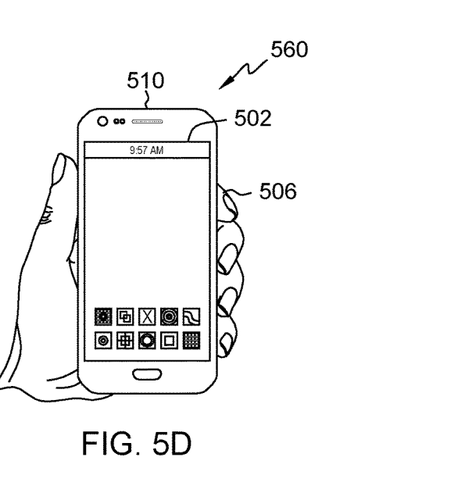
FIG. 5D depicts a mobile computing device operating the virtual control program with an active screen display on the computing device, responsive to the user interaction, in accordance with an embodiment of the present invention.

In FIG. 5D, mobile computing environment 560, computing device 510 completes the power on process with increased functionality and displays the home screen via front touchscreen 502. The user resumes holding computing device 510 in the left hand and removes finger 506 from front touchscreen 502. Virtual control program 200 monitors for a continuous motion and/or sequence of defined interactions to occur prior to displaying additional virtual control buttons.

FIG. 6 depicts multiple examples of a user interaction with computing device 610 and virtual control program 200. It should be recognized that example FIGS. 6A-D are just a few variations of the multiple possible configurations and interactions. FIG. 6A depicts mobile computing environment 600 operating virtual control program 200 in which mobile computing device 610 is powered on, as noted by the display of a home screen on the front touchscreen (e.g., front touchscreen 114). As depicted, mobile computing device 610 is held in the left hand of the user. Virtual control program 200 detects an interaction between the left hand of the user and the back capacitive surface (e.g. back capacitive surface 126), which includes an interaction with thumb 602.

Figure 6A:
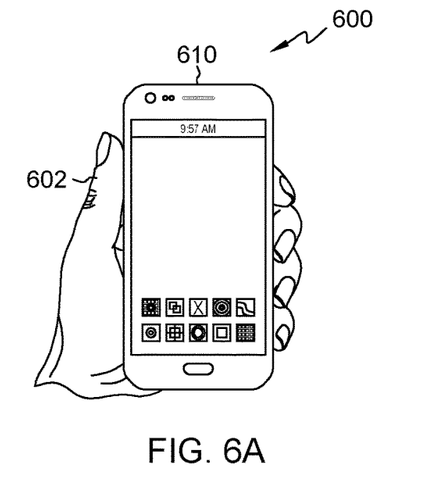
FIG. 6A depicts a mobile computing device in which the screen is active, in accordance with an embodiment of the present invention.
Figure 6B:
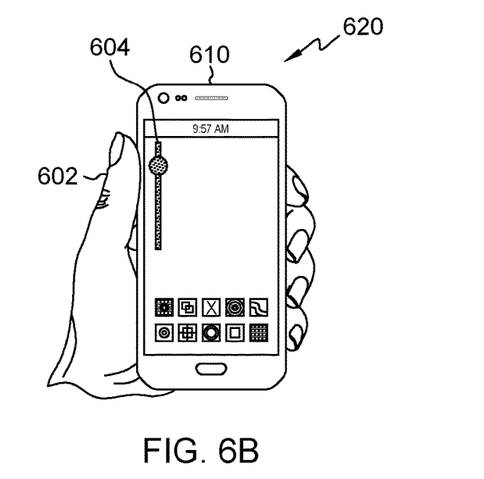
FIG. 6B depicts the mobile computing device operating the virtual control program that identifies an interaction with a user via the capacitive sensing surfaces on the left side of the computing device that initiates a virtual volume control button, in accordance with an embodiment of the present invention.

In FIG. 6B, mobile computing environment 520, the user slides thumb 602 from the back capacitive surface to the right capacitive surface (right capacitive surface 118), and then to the front touchscreen. Virtual control program 200 identifies a continuous motion that encompasses three capacitive surfaces. Virtual control program 200 identifies the continuous motion as a defined sequence to initiate volume control 604 on computing device 610. Virtual control program 200 displays volume control 604 on the left side of the front touchscreen. While volume control 604 is placed in close proximity to thumb 602, thumb 602 does not connect to volume control 604 without additional movement of thumb 602 by the user.

Figure 6C:
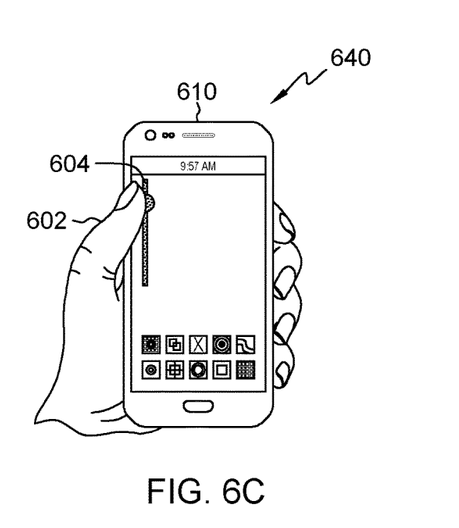
FIG. 6C depicts the mobile computing device operating the virtual control program that identifies the user interacts with the virtual volume control button on the computing device from the left side, in accordance with an embodiment of the present invention.

In FIG. 6C, mobile computing device 640, virtual control program 200 detects thumb 602 interacts with volume control 604. As volume control 604 is a slide motion control, virtual control program monitors the coordinate grid for coordinate changes from the point of intersection between thumb 602 and volume control 604.

Figure 6D:
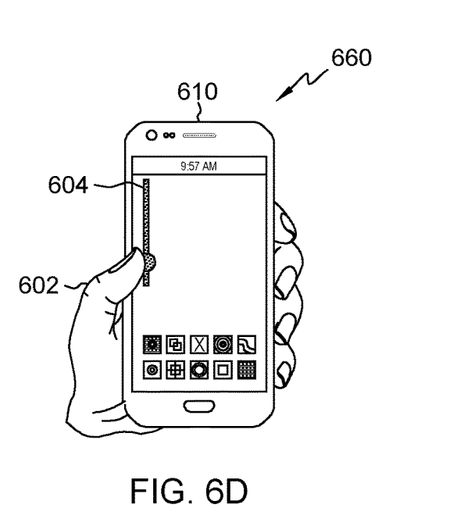
FIG. 6D depicts a mobile computing device operating the virtual control program that adjusts the virtual control button of the computing device to a lower volume in response to the user interaction, in accordance with an embodiment of the present invention.

In FIG. 6D, mobile computing environment 660, virtual control program 200 determines the coordinate changes correspond to a decrease in volume control 604. Virtual control program 200 lowers the volume and updates the visual component of volume control 604 to correspond to the changes in the coordinates, thereby notifying the user of receipt of the change. Once the user removes thumb 602 from volume control 604, virtual control program 200 begins the elapsed time counter which must expire prior to virtual control program 200 removing volume control 604. If the user interacts with volume control 604 prior to the expiration of the elapsed time, virtual control program 200 incorporates the change and resets the elapsed time counter (i.e., begins a new countdown) prior to removing volume control 604.

Figure 7:
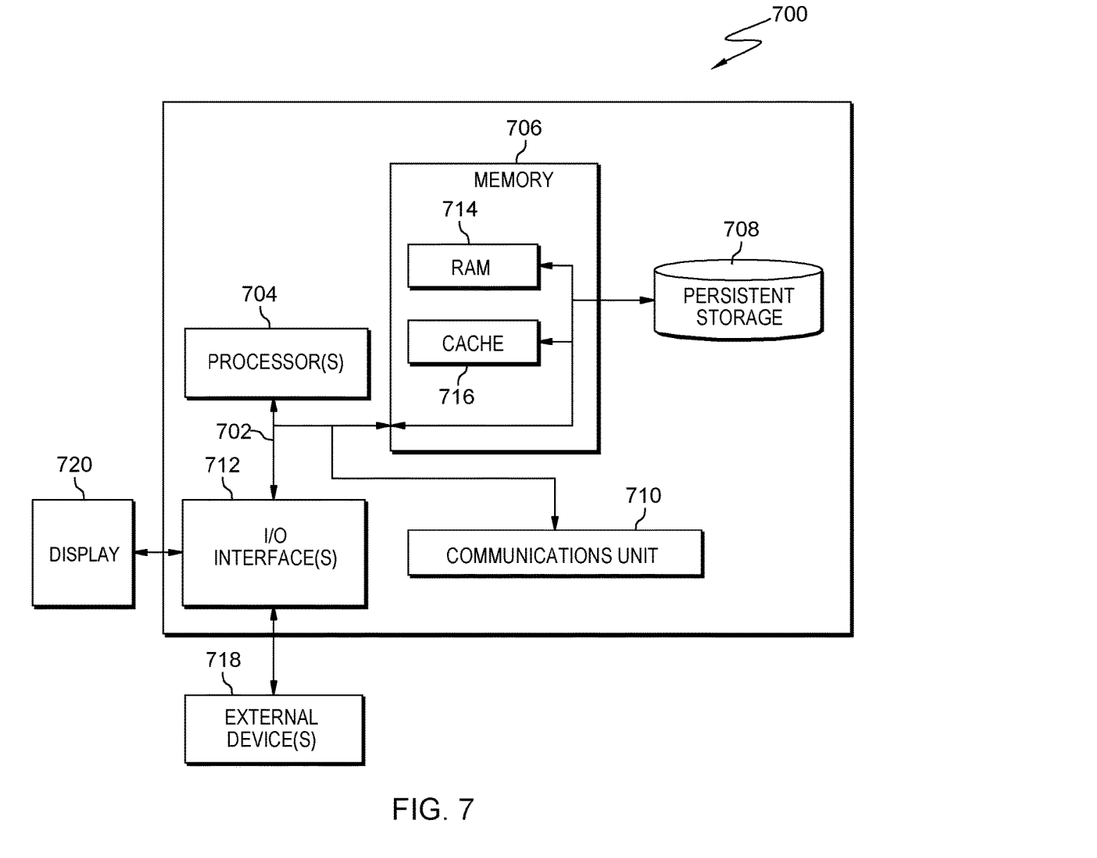
FIG. 7 is a block diagram of components of the capacitive sensing computing device executing the virtual control program, in accordance with an embodiment of the present invention.

FIG. 7 depicts a block diagram of components of capacitive sensing computing device 700, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Capacitive sensing computing device 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM) 714. In general, memory 706 can include any suitable volatile or non-volatile computer readable storage media. Cache 716 is a fast memory that enhances the performance of computer processor(s) 704 by holding recently accessed data, and data near accessed data, from memory 706.

User interface 112 and virtual control program 200 may be stored in persistent storage 708 and in memory 706 for execution and/or access by one or more of the respective computer processor(s) 704 via cache 716. In an embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. User interface 112 and virtual control program 200 may be downloaded to persistent storage 708 through communications unit 710.

I/O interface(s) 712 allows for input and output of data with other devices that may be connected to capacitive sensing computing device 700. For example, I/O interface(s) 712 may provide a connection to external device(s) 718, such as a keyboard, a keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., user interface 112 and virtual control program 200, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for controlling a computing device without mechanical buttons the computer program product comprising:

one or more non-transitory computer readable storage media and program instructions stored on the one or more computer readable storage media, the program instructions comprising:

program instructions to detect an interaction with a touch capacitive sensing surface on a computing device, wherein the computing device includes touch capacitive sensing surfaces in place of mechanical buttons;

program instructions to determine whether the detected interaction is a first interaction, wherein the first interaction starts a defined sequence of at least three interactions;

responsive to determining the detected interaction is the first interaction, program instructions to identify the first interaction with a first touch capacitive surface of the computing device and coordinates of the first interaction;

program instructions to detect a change in the coordinates of the first interaction;

program instructions to determine whether the change in coordinates of the first interaction are within the first touch capacitive sensing surface, wherein the change in the coordinates of the first interaction is based on determining whether the first interaction changes from a first geometric plane to a second geometric plane, wherein the coordinates of the first interaction are associated with a single set of coordinates;

responsive to determining the change in coordinates of the first interaction are not within the first touch capacitive sensing surface, program instructions to identify a second interaction with a second touch capacitive sensing surface of the computing device and coordinates of the second interaction;

program instructions to detect a change in the coordinates of the second interaction;

program instructions to determine whether the change in coordinates of the second interaction are within the second touch capacitive sensing surface, wherein the change in the coordinates of the second interaction is based on determining whether the second interaction changes from one of the following: the second geometric plane to a third geometric plane, and the second geometric plane to the first geometric plane;

responsive to determining the change in coordinates of the second interaction are not within the second touch capacitive sensing surface, program instructions to identify a third interaction with a third capacitive surface of the computing device, and coordinates of the third interaction;

program instructions to compare the first interaction, the second interaction, and the third interaction in order with defined interactions in memory, wherein the first interaction, the second interaction, and the third interaction in order form a single type of defined interaction selected from a group of types of defined interactions stored in memory that include: a continuous motion that includes at least three touch capacitive sensing surfaces and a sequence of defined interactions that includes a series of separate interactions with at least three touch sensing capacitive surfaces, wherein the series of separate interaction includes one or more of adjacent interactions and non-adjacent interactions, wherein the detected interaction is a defined interaction that is a customized predefined interaction created by a user wherein the defined interaction links to a specific action that identifies a specific virtual control for operating an aspect of the computing device;

program instructions to identify a match between the first interaction, the second interaction, and the third interaction in order and the defined interactions in memory based on the comparison;

program instructions to determine a virtual control button based on the identified match;

program instructions to determine that a time length of the first interaction, the second interaction, and the third interaction in order at least meets a defined time;

program instructions to display the determined virtual control button on the computing device in proximity to the third interaction to the user;

program instructions to receive an interaction with the displayed virtual control button; and program instructions to implement an action associated with the determined virtual control button based on the received interaction.

* * * * *